3,293,221
PROCESS FOR THE PRODUCTION OF COPOLYMERS OF FORMALDEHYDE OR TRIOXANE
Werner Kern and Volker Jaacks, Mainz (Rhine), Germany, assignors to Deutsche Gold- und Silber-Scheideanstalt vormals Roessler, Frankfurt, Germany
No Drawing. Filed Oct. 13, 1965, Ser. No. 495,666
Claims priority, application Germany, Aug. 29, 1959, D 31,399; Mar. 10, 1960, D 32,824
9 Claims. (Cl. 260—67)

This application is a continuation-in-part of application Serial No. 52,051, filed August 26, 1960.

The present invention relates to the production of thermally and chemically stable solid copolymers of formaldehyde or trioxane and more particularly to such copolymers as are obtained with 1,3-dioxacycloheptane as comonomer.

Polyoxymethylene polymers having recurring —$CH_2O$— units which can be produced by the polymerization of anhydrous formaldehyde or trioxane have been known for some time. Such polymers vary in molecular weight, for example, between about 5,000 and 500,000, depending on their method of preparation. They furthermore are generally more or less thermally and chemically unstable in view of their tendency to depolymerize or decompose fairly readily when subjected to heat (thermal decomposition), when subjected to the action of oxygen, particularly at higher temperatures of over 160° C., through an auto-oxidation mechanism and especially when exposed to light, and when subjected to hydrolytic conditions both acid and alkaline.

According to the invention it was found that the copolymerization of essentially anhydrous formaldehyde or trioxane with 1,3-dioxacycloheptane (the formal of 1,4-butanediol) will produce a polyoxymethylene copolymer in which chains of recurring —$CH_2O$— units are interrupted by units formed by opening up of the cyclic structure of the dioxacycloheptane which are built in during the copolymerization. The copolymers thus obtained exhibit unexpectedly high stability against the three types of depolymerization or decomposition mentioned above.

The copolymerization according to the invention can be carried out as a bulk polymerization, particularly, in the case of trioxane but preferably is carried out in an inert organic solvent under essentially anhydrous conditions, that is, in the presence of less than about 1% of water and preferably less than about 0.1% by weight of water. Aliphatic hydrocarbons, such as, hexane, heptane, petroleum ether and particularly cyclohexane, chlorinated aliphatic hydrocarbons, such as, 1,2-ethylene chloride and particularly methylene chloride and nitrobenzene can, for example, be employed as inert organic solvents. The temperature for the copolymerization can be between about —100° C. and +150° C.

The copolymerization can, for example, be initiated with ionic catalysts, such as, boron trifluoride and tin tetrachloride, as well as the organic esters of perchloric acid and the mixed anhydrides of perchloric and carboxylic acids as disclosed in U.S. Patent 3,122,525 which are of the formula:

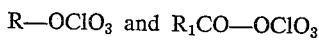

respectively, wherein R and $R_1$ are the radicals derived from the alcohol or acid used for the esterification or the formation of the mixed anhydrides. Examples thereof, for instance, are tertiary butyl perchlorate, acetyl perchlorate, benzoyl perchlorate, caproyl perchlorate, propionyl perchlorate, phenyl acetyl malonoyl perchlorate.

The ratio of the formaldehyde or trioxane to the 1,3-dioxacycloheptane in the reaction mixture is so regulated that about 0.1 to 50 mol percent and, preferably, 0.5 to 3 mol percent of the units derived from the dioxacycloheptane are incorporated in the copolymer. The ratio of oxymethylene units to dioxacycloheptane units in the polymer is not identical with the ratio of the monomers in the starting mixture as the dioxacycloheptane is many times less reactive than formaldehyde and only partially as reactive as trioxane. Frequently, therefore, a monomer mixture must be used which is richer in the dioxacycloheptane content than the resulting copolymer is intended to be. The unreacted portions of the dioxacycloheptane can be recovered after termination of the polymerization reaction.

The recovery of the finished copolymers follows the usual procedures. The various phases are separated mechanically and the polymeric product treated with purifying or washing agents, such as, aqueous solutions of sodium hydroxide and methanol or by recrystallization from solvents, such as, dimethyl formamide in order to remove residual quantities of catalysts or initiators and unreacted monomer.

An additional advantageous stabilizing effect against auto-oxidation can be imparted to the copolymers obtained according to the invention by the use of known antioxidants, such as, the amine and phenolic anti-oxidants, phenyl-β-naphthyl amine, triphenyl amine, 2,6-ditertiary butyl-4-methyl phenol.

The following examples will serve to illustrate the invention.

*Example 1*

50 parts by weight of water free trioxane and 3 parts by weight of 1,3-dioxacycloheptane were dissolved in 100 parts by weight of methylene chloride. One part by weight of boron trifluoride etherate was then added to the solution. The reaction mixture was permitted to stand at room temperature (about 20° C.) until the poymerization reaction ended and the resulting copolymer was filtered off and purified by treatment with warm aqueous NaOH and methanol. The product lost less than 1 part per 100 by weight per hour at 180° C.

*Example 2*

2.9 parts by weight of 1,3-dioxacycloheptane were added to 40 parts by weight of melted water free trioxane at 65° C. The polymerization was initiated by the addition of $0.75 \times 10^{-3}$ parts by weight of boron trifluoride (in the form of its diethyl etherate). After 10 minutes the reaction mixture was cooled down and the resulting copolymer pulverized and washed out with water to which a little ammonia had been added, and dried under vacuum at 50° C. The yield was 90% with reference to the sum of the monomers. Upon being heated at 222° C. under nitrogen the copolymer only suffered a weight loss of 0.035% per minute.

*Example 3*

18.5 parts by weight of 1,3-dioxacycloheptane were added to 40 parts of melted trioxane at 75° C. The polymerization was then initiated by addition of 0.007% by weight of boron trifluoride diethyl etherate (as a 5% solution in nitro methane). After 1 hour at 75° C. the polymerization was terminated by cooling and the polymeric product processed as in Example 2. The yield again was 90% and such product only lost 0.01% of its weight per minute upon being heated to 222° C. under nitrogen.

*Example 4*

A prepolymerizate was prepared from 3 parts by weight of 1,3-dioxacycloheptane and 0.01 part by weight of boron trifluoride diethyl etherate by intimate mixing at room temperature. Such prepolymerizate had the consistency of a colorless, viscous oil. This oil was mixed with 90 parts by weight of melted trioxane at 75° C. The mixture was heated to 80° C. and polymerization was completed within 2.5 minutes. After processing as in the preceding examples a copolymer with an inherent viscosity of 0.8 (measured in dimethyl formamide) was obtained in a yield of 74%. 86% of such copolymer was stable upon heating at 220° C. under nitrogen.

*Example 5*

Water free monomeric formaldehyde was produced by acidolysis of trioxane on a phosphoric acid catalyst and purified by prepolymerization in a 1 liter round flask filled with Raschig rings (see A. Giefer, V. Jaacks and W. Kern, Makromolekulare Chemie 74, 46 (1964)). The water free monomeric formaldehyde was introduced at a velocity of about 25 g./hour into a solution of 10 mg. of tin tetrachloride and 2 g. of 1,3-dioxacycloheptane in 80 ml. of nitro benzene which was being intensively stirred at 50° C. After 30 minutes and 60 minutes reaction period, respectively, the comonomer consumed was replenished each time with 2 g. of 1,3-dioxacycloheptane. After 90 minutes the introduction of the formaldehyde was terminated and the copolymer produced filtered off. 25 g. of a pure white powder were obtained. In order to remove the low molecular weight impurities it was recrystallized from dimethyl formamide, washed with acetone and finally dried.

The stability of the product under nitrogen at 200° C. was investigated. During the first hour at such temperature it lost 16% by weight but thereafter only 1% per hour. A polyoxymethylene produced under the same conditions, but in the absence of 1,3-dioxacycloheptane, in contrast suffered 90% decomposition loss when heated 1 hour at this temperature. The copolymer melted at 170-175° C. and after incorporation of a phenolic antioxidant could be processed to tough hard shaped articles which were absolutely stable against boiling water.

We claim:
1. A method of preparing solid copolymers which comprises copolymerizing at least one formaldehyde compound selected from the group consisting of monomeric formaldehyde and trioxane with 1,3-dioxacycloheptane under essentially water free conditions.
2. The method of claim 1 in which said formaldehyde compounds is copolymerized with 0.1 to 50 mol percent of 1,3-dioxacycloheptane.
3. The method of claim 1 in which said formaldehyde compound is copolymerized with 0.5 to 3 mol percent of 1,3-dioxacycloheptane.
4. The method of claim 2 in which said copolymerization is carried out in the presence of boron trifluoride etherate as catalyst.
5. The method of claim 2 in which said copolymerization is carried out in the presence of tin tetrachloride as catalyst.
6. The method of claim 2 in which the copolymerization is conducted in an inert organic solvent.
7. The method of claim 2 in which the formaldehyde compound is trioxane.
8. The copolymer obtained by the process of claim 2.
9. The copolymer obtained by the process of claim 3.

References Cited by the Examiner
UNITED STATES PATENTS

| | | | |
|---|---|---|---|
| 2,870,097 | 1/1959 | Pattison | 260—67 |
| 3,027,352 | 3/1962 | Walling et al. | 260—67 |
| 3,194,788 | 7/1965 | Kullmer et al. | 260—67 |
| 3,210,297 | 10/1965 | Fischer et al. | 260—67 |
| 3,256,246 | 6/1966 | Gutweiler et al. | 260—67 |

WILLIAM H. SHORT, *Primary Examiner.*

L. M. MILLER, *Assistant Examiner.*